US012404149B2

(12) United States Patent  
Haarhoff et al.

(10) Patent No.: US 12,404,149 B2  
(45) Date of Patent: Sep. 2, 2025

(54) APPARATUS FOR CONTROLLING A LOAD SUSPENDED ON A CORD

(71) Applicant: Construction Robotics GmbH, Aachen (DE)

(72) Inventors: Daniel Haarhoff, Cambridge (GB); Sven Christoph Stumm, Aachen (DE); Sigrid Brell-Cokcan, Aachen (DE)

(73) Assignee: Construction Robotics GmbH, Aachen (DE)

( * ) Notice: Subject to any disclaimer, the term of this patent is extended or adjusted under 35 U.S.C. 154(b) by 996 days.

(21) Appl. No.: 17/603,131

(22) PCT Filed: Apr. 14, 2020

(86) PCT No.: PCT/EP2020/060477  
§ 371 (c)(1),  
(2) Date: Oct. 12, 2021

(87) PCT Pub. No.: WO2020/208263  
PCT Pub. Date: Oct. 15, 2020

(65) Prior Publication Data  
US 2022/0185635 A1 Jun. 16, 2022

(30) Foreign Application Priority Data  
Apr. 12, 2019 (DE) .......................... 102019205329.7

(51) Int. Cl.  
*B66C 13/06* (2006.01)  
*B66C 13/08* (2006.01)  
(Continued)

(52) U.S. Cl.  
CPC ............ *B66C 13/06* (2013.01); *B66C 13/063* (2013.01); *B66C 13/08* (2013.01); *B66C 13/085* (2013.01); *G01C 19/00* (2013.01); *B66C 13/46* (2013.01)

(58) Field of Classification Search  
CPC ....... B66C 13/06; B66C 13/063; B66C 13/08; B66C 13/085; B66C 13/46; G01C 19/00  
See application file for complete search history.

(56) References Cited

U.S. PATENT DOCUMENTS 5,871,249 A * 2/1999 Williams ................ G01C 21/18  
74/5.34  
5,961,563 A * 10/1999 Overton ................ B66C 13/063  
701/50

(Continued)

FOREIGN PATENT DOCUMENTS

WO WO 2015/082347 A1 6/2015  
WO WO 2018/192675 A1 10/2018

OTHER PUBLICATIONS

International Search Report for PCT Application No. PCT/EP2020/060477 dated Jul. 24, 2020.

*Primary Examiner* — Thomas Randazzo  
(74) *Attorney, Agent, or Firm* — Lippes Mathias LLP (57) ABSTRACT

The present invention relates to an apparatus for controlling a load suspended on a cord, wherein the movable load has a controllable actuator, and a control unit is provided, which is configured to use control commands for controlling the actuator in order to predict a load countermovement to be expected, so as to compensate for and/or prevent the load countermovement by controlling at least one compensating device controlled by the control unit.

10 Claims, 6 Drawing Sheets

(51) Int. Cl.
*B66C 13/46* (2006.01)
*G01C 19/00* (2013.01)

(56) References Cited

U.S. PATENT DOCUMENTS

| | | | | |
|---|---|---|---|---|
| 6,568,291 | B1 * | 5/2003 | Inman | B64G 1/285 |
| | | | | 74/5.34 |
| 11,738,975 | B2 * | 8/2023 | Mastrup | B66C 13/06 |
| | | | | 212/273 |
| 2015/0344271 | A1 * | 12/2015 | Schneider | B66C 13/06 |
| | | | | 701/50 |
| 2016/0297650 | A1 * | 10/2016 | Bang | B66C 13/085 |
| 2018/0251346 | A1 * | 9/2018 | Thomson | B66C 13/08 |
| 2019/0375615 | A1 * | 12/2019 | Markwell | B66C 1/10 |

\* cited by examiner

APPARATUS FOR CONTROLLING A LOAD SUSPENDED ON A CORD

CROSS REFERENCE TO RELATED APPLICATIONS

This is a 371 of PCT Application No. PCT/EP2020/060477, filed Apr. 14, 2020, which claims the benefit of German Application No. 102019205329.7, filed Apr. 12, 2019, the contents of which are incorporated herein in their entirety.

The present invention relates to an apparatus for controlling a load suspended on a cord.

Loads have always been moved by cranes. The load is usually suspended on at least one cord that is attached to the crane. Normally, the cord runs across sheaves on the crane so that the length of the cord can be adjusted by means of a suitable drive so as to move the load in a vertical direction. In a tangential direction, the load can usually be moved by rotating the crane. In a radial direction, the load can regularly be moved by means of a trolley that is movable in a horizontal direction or by means of a luffable jib. In the case of gantry and overhead cranes, the movements take place in a Cartesian spatial direction, instead of radially and tangentially, by moving a beam provided with a trolley that is movable thereon. In most cases, the cord has a hook at its free end, the load being usually releasably attached to this hook.

Normally, the above-mentioned movements caused by the crane control system lead to spherical pendulum oscillations of the load, which can be damped by means of intelligent control of the crane control system. Such intelligent control is referred to as "load-sway damping" in technical jargon and is known from FR 2 445 299 A1, by way of example.

Spherical pendulum oscillations of a load may also be caused by external disturbance variables, such as wind or shocks. This influence of external disturbance variables has to be additionally taken into account in the case of a crane and has the effect that spherical pendulum oscillations of the load may occur even if the suspension point of the cord is held stationary.

The known load-sway damping only focuses on the dynamics in the area between the hook and the suspension point of the cord. It is here left out of account that also a movement of the load, caused e.g. by wind or by strokes against buildings, may lead to a pendulum movement of the load, which will render load-sway damping more difficult and reduce its efficiency. The present invention aims at providing a comprehensive solution for stabilizing a load suspended on a cord, which in particular also takes into account the interactions of the two above-mentioned dynamics.

Hence, it is an object of the present invention to improve control over the position and the movement of a load suspended on a cord, so as to allow controlled positioning and movement of an actuator.

In order to achieve this object, the present invention suggests an apparatus having the features according to claim 1.

The apparatus according to the present invention has a controllable actuator. This controllable actuator is, for example, an equipment with which assembly work on a building can be executed during construction of the latter. Such an actuator may, for example, consist of an assembly robot. The apparatus according to the present invention has a control unit configured for using control commands for controlling the actuator with respect to the movement thereof as well as for predicting the resultant counter forces, counter torques and movements associated therewith. This prediction is used for controlling a compensating device, which is suspended on the cord and can be regarded as part of the load and which usually compensates or prevents the expected countermovement at the same time as the actuator is controlled. The countermovement to be expected can be calculated or read out from a memory, which is e.g. supplemented also by artificial intelligence during operation and which determines actual countermovements while the actuator is being controlled and includes them in the prediction of future countermovements. The compensating device may here be any conceivable device which is usually directly connected to the load and which is able to generate a compensating torque/force, usually several compensating torques that act orthogonally to one another. The compensating torque or the compensating force may here be generated by a movable mass connected to the load, by an impulse, for example by an impulse generated by a surge of fluid, by a robot connected to a balancing mass, or by a gyroscope. The aforementioned means may also be connected to the load in combination. The balancing device in question is here controlled via the control unit. The compensating device and the actuator are usually connected via a common control unit, which, in the case of an assembly robot, controls the assembly movements of the latter on the one hand, and, in parallel and simultaneously, causes the compensating device to hold the load in its position or to change it in space in a predetermined manner, without interference on the part of the disturbances resulting from the assembly movements.

On the basis of this embodiment, the apparatus according to the present invention fully or partially prevents the reaction movement of the load that will normally inevitably result when the actuator is operated. Thus, the load will remain in position, whereby the load can be held true to position, even if at least one actuator is driven on the load.

The apparatus according to the present invention for controlling a load suspended on a cord preferably comprises a plurality of gyroscopes, which are adapted to be coupled to the load for transmitting a moment of force, the moment of force being generable by a rotation of an axis of rotation of at least one of the gyroscopes, and a control unit, which is connected to the gyroscopes in terms of control and by means of which the rotation of the axis of rotation is controllable in such a way that a pendulum movement of the load can be compensated for and/or prevented and the load can be tilted and/or rotated about its suspension on the cord. The apparatus may be integrated in a coupling element, for example a hook, for attaching the load to the cord. The apparatus may be adapted to be coupled to the load indirectly in that, for example, the load is fastened to the coupling element by fastening elements and the fastening elements transmit the moment of force of the gyroscopes to the load. However, the apparatus may also be adapted to be coupled to the load directly, in particular it may be connected thereto in rotationally fixed manner, so that the torque of the gyroscopes of the apparatus will be transmitted to the load directly.

A cord within the meaning of the present invention is usually understood to be a rope, normally formed of natural or synthetic fibers or wires, twisted or braided together. A rope is normally an elongate elastic element that is resistant to tensile stress. A cord in the sense of the present invention may have a hook at its free end, which normally has the load releasably attached thereto. The hook may be attached to the cord such that it is secured against rotation relative thereto, or it may be attached to the cord via a rotary bearing. Preferably, the hook is rotatable through the rotary bearing by at least 180°, very preferably by 360°, in the horizontal plane. A load in the sense of the present invention may be a rigid component, e.g. a steel beam or a platform, a movable element, e.g. a living being or a robot, or a combination of a rigid component and a movable element. The present invention especially takes into consideration freely suspended cords, so that a load attached to the cord will in principle be capable of spherical pendulum movements.

Preferably, the apparatus according to the present invention is releasably connected to the load in a rotationally fixed manner. Further preferably, the apparatus according to the present invention is integrated in a platform, which can be attached, e.g. by means of ropes, to the hook of the cord, the platform carrying the load or the load being attached to the platform.

A gyroscope according to the present invention comprises a rotor, a motor to rotate the rotor about a rotor axis, the rotor axis being usually connected to the rotor in a in a rotationally fixed manner, a gimbal and a gimbal torque motor to rotate the gimbal about a gimbal axis, the rotor being mechanically supported in the gimbal so that the rotor axis will rotate when the gimbal rotates. The gimbal axis and the rotor axis are usually normal to each other, so that a rotation of the rotor axis of the rotating rotor generates a resultant torque in a third direction orthogonal to the gimbal axis and the rotor axis. This resultant torque is usually transmitted to the apparatus via the bearings rotating the gimbal. The bearings may be supported by a gimbal support of the apparatus, to which the load can be attached. A gyroscope according to the present invention may be configured as described in EP 0 675 824 B1. The fundamental relationship between the angular momentum of the rotor $\vec{h}$ the angular velocity of the gimbal $\vec{\omega}$ and the resultant torque $\vec{\tau}$ is given by the equation $$\vec{\tau} = -\vec{\omega} \times \vec{h}$$

If the angular momentum of the rotor $\vec{h}$ is orthogonal to the angular velocity of the gimbal $\vec{\omega}$, the resultant torque $\vec{\tau}$ in the third direction will be proportional to the angular velocity of the gimbal. The angular momentum of the rotor is usually kept at a constant value by the motor associated with the rotor.

For example, "An attitude control and stabilization of an unstructured object using balancing beam, new construction machinery—2001" discloses an apparatus comprising a gyroscope for attitude stabilization of a load (steel beam) suspended from a cord. The gyroscope is here oriented such that, by rotating the axis of rotation of the gyroscope, a torque acts in a vertical direction on the apparatus, the torque being transmitted to the steel beam connected to the apparatus. The rotation of the axis of rotation of the gyroscope can be controlled via a remote control and the steel beam can be rotated in the horizontal plane in this way.

The apparatus according to the present invention has a control unit that is connected to a plurality of gyroscopes in terms of control. In particular, the control unit controls the resultant torque in a third direction by controlling the gimbal torque motor of the gyroscopes. The number of gyroscopes according to the present invention is at least two. One gyroscope may be arranged such that its resultant torque points in a vertical direction, and a second gyroscope may be arranged such that its resultant torque points in a horizontal direction. Thus, a load connected to the apparatus can be tilted about a horizontal axis and the horizontal axis can be rotated about the vertical.

This controlled change in position of the load can be controlled by the control unit in such a way that a pendulum movement of the load can be compensated for and/or prevented. The control unit may communicate with an optical sensor and/or an acceleration sensor, the sensor detecting a pendulum movement of the load, and/or it may receive information via an information interface about a pendulum movement to be expected. The control unit may communicate with a sensor for detecting the wind conditions or a sensor or a camera for detecting a distance of the load to other objects, the sensor signals being evaluable by a logic unit of the control unit for calculating in advance a pendulum movement to be expected due to excitation by wind or a stroke. Also a sensor for detecting a change in position of the center of gravity of the apparatus and/or the load may be provided and configured such that it is adapted to transmit signals to the control unit.

In view of the fact that the control unit of the apparatus according to the present invention is configured such that it is adapted to compensate and/or prevent a pendulum movement of the load as well as to tilt and rotate the load around its suspension, the control of the attitude and the movement of the load suspended on a cord can be improved compared to the prior art.

Preferably, the number of gyroscopes according to the present invention is at least three, with the resultant torques of a first, a second and a third gyroscope typically pointing in spatial directions orthogonal to one other, respectively. Thus, a resultant total torque can be generated in any spatial direction at a given time. In this way, pendulum movements can be compensated for and/or prevented more efficiently.

Particularly preferred, the number of gyroscopes according to the present invention is at least four. Singularities can thus be avoided. The sum of the angular momentum vectors of all gyroscopes can be changed, both in orientation and magnitude, by rotating their gimbals. The change of the angular momentum vector usually corresponds to the resultant torque. The angular momentum of the gyroscopes and the arrangement of their gimbal axes span a specific angular momentum space. Having arrived at the outer envelope of the specific angular momentum space, the arrangement cannot develop a torque in specific directions. This is referred to as external singularities or saturation. Depending on the arrangement, further singularities arise inside the specific angular momentum space, if, for example, several angular momentum vectors are parallel.

When the apparatus has at least four gyroscopes, which are arranged in a certain orientation relative to each other, the angular momentums of the gyroscopes can be changed in such a way that no resultant total torque will arise. This opens up the possibility of putting the gyroscopes in response to information about a pendulum movement to be expected into a state in which the apparatus according to the present invention will be able to compensate and/or prevent the expected pendulum movement in a particular efficient manner. Preferably, four gyroscopes are arranged in a so-called pyramid configuration ("CMG pyramid array").

According to a preferred further development of the present invention, the apparatus is configured such that, in a position which does not correspond to the equilibrium position, the load can be held in an equilibrium of forces. As a rule, the equilibrium position is to be understood as the position which the load assumes when, apart from the weight force and the rope force compensating the weight force, no other external forces act on the load. The equilibrium position is normally the position of the lowest possible potential energy, provided that the length of the cord is not changed. It follows that, if the load is moved away from this equilibrium position, a restoring force in the direction of the equilibrium position will be induced. The rotors, the motors driving the rotors, the gimbals and the gyroscopes' gimbal torque motors driving the gimbals are preferably configured such that they are able to compensate this restoring force. In this way, an equilibrium of forces can be established in a position of the load that does not correspond to the equilibrium position.

According to an additional preferred further development of the present invention, the load comprises a movable element, the control unit being configured in such a way that a countermovement of the load, which may be caused by a movement of the movable element, can be compensated and/or prevented by controlling at least one of the gyroscopes. A movable element within the meaning of the present application may be a living being, in particular a human being, a robot or another controllable actuator. According to the third Newtonian axiom, any movement of the movable element usually results in a countermovement of the load. This countermovement may cause a pendulum oscillation of the load and must therefore be compensated for and/or prevented, so as to stabilize the load attitude.

The present further development is preferably intended to be used for persons to be roped down, who are to be protected against pendulum movements and whose space of action is to be enlarged, and particularly preferred for persons staying on a platform and/or an actuator attached to the platform for executing a working step. The apparatus may have a sensor that detects a movement of the movable element and transmits its signals to the control unit, which evaluates these signals to compensate and/or prevent a countermovement of the load by controlling at least one of the gyroscopes.

In this way, the apparatus according to this further development can open up new action possibilities and enlarge its action radius.

Preferably, the load has a controllable actuator as a movable element, the control unit being configured to use control commands of a control module for controlling the actuator in order to predict a load countermovement to be expected, so as to compensate for and/or prevent the load countermovement by controlling at least one of the gyroscopes. The control module of the actuator may be configured as a separate module adapted for communication with the control unit, or may be integrated in the control unit. Normally, the control module is connected to at least one drive of the actuator in terms of control. In most cases, the control module is configured such that it is adapted for communication with at least one sensor associated with the actuator. A logic unit usually evaluates the control commands of the control module of the actuator. Preferably, the logic unit compares the control commands of the control module with a response plan, which is stored in the control unit and from which the load countermovement to be expected can be seen. The response plan may have been created in a secure environment, running through the possible control sequences of the actuator, simulation in advance, simulative prediction and by detecting the respective countermovements of the load. Typically, the logic unit is able to predict and/or estimate, through the control commands of the control module and through the response plan, the motor moments of the at least one drive of the actuator and an associated countermovement to be expected.

Further preferably, the movements of the controllable actuator are controllable such that they supportively compensate and/or prevent the pendulum movement of the load. This may be necessary, if the pendulum movement of the load reaches an extent that cannot be compensated for and/or prevented by means of the gyroscopes alone. Through communication between the control unit and the control module, the respective control commands are coordinated with each other. The compensating device need not necessarily be provided with a gyroscope.

According to an additional preferred embodiment of the present invention, the controllable actuator is configured such that, by means of the actuator, a working step can be executed, whose moment of interaction on the load can be compensated for by controlling at least one of the gyroscopes. In particular, the gripping, moving or fastening of objects and/or components, welding, pressing, spraying on paint or the like can be considered as a working step. For executing a working step, a force or a moment of force may be necessary. This force or moment of force can be generated by the drive of the actuator. According to the third Newtonian axiom, such a force or moment of force will normally induce an interaction force moment, usually around the center of mass of the apparatus, which can be compensated for by controlling at least one of the gyroscopes. It is also conceivable that the moment of force or the force required for executing the working step is generated by controlling at least one of the gyroscopes. Preferably, the forces or the moments of force required for the working steps that can be executed by means of the actuator are stored in the logic unit.

The apparatus according to this further development thus allows automated working steps to be executed at locations that are difficult to access. The apparatus according to this preferred further development may be attached to a crane, by way of example, and is therefore particularly suitable for construction sites.

According to an additional preferred embodiment of the present invention, the apparatus includes a sensor for detecting an external disturbance variable, the signals of this sensor being transmittable to the control unit and being adapted to be evaluated by the latter for compensating for and/or preventing the pendulum movement of the load by controlling at least one of the gyroscopes. An external disturbance variable within the meaning of the present invention is usually an external influence acting on the system consisting of the apparatus, the cord, the load and possibly the crane. An external disturbance variable is, for example, the wind, strokes against other things and/or objects or manual pulling or pushing on the device. Preferably, the control unit communicates with a sensor for detecting the wind conditions or a sensor for detecting a distance of the load to other objects, the signals of this sensor being evaluable by a logic unit of the control unit for calculating in advance a pendulum movement to be expected due to excitation by wind or a stroke. The logic unit usually calculates a torque that is suitable for compensating, i.e. normally weakening, or preventing the pendulum movement to be expected. The control unit then preferably controls the gyroscopes at the time of the expected onset of the pendulum movement.

According to an additional preferred embodiment of the present invention, the apparatus includes a sensor for detecting a pendulum movement of the load, the signals being adapted to be transmitted to the control unit and evaluated by the latter for compensating for and/or preventing the pendulum movement of the load by controlling at least one of the gyroscopes. The sensor according to this further development may be an optical sensor or an acceleration sensor. Also conceivable is the inductive measurement of a cord deflection, the determination of a pulling direction on the cord by force sensors and/or a position determination by means of radar sensors.

According to an additional preferred embodiment of the present invention, the apparatus includes a sensor for detecting a position of the load relative to its suspension, the signals being adapted to be transmitted to the control unit and evaluated by the latter. The sensor according to this further development may be an optical sensor. Preferably, the apparatus includes a sensor gyroscope configured as a position sensor, wherein the gimbal of the sensor gyroscope is usually connected to the load in a rotationally fixed manner, so that due to the conservation of angular momentum of the rotor of the sensor gyroscope, a change in position of the load will lead to a change in position of the rotor axis of the sensor gyroscope relative to the gimbal.

According to an additional preferred embodiment of the present invention, the apparatus includes a module for determining an inertia of the load based on a measured rotational speed of the load and a torque transmitted to the load by at least one of the gyroscopes. As is generally known, a torque is the product of a moment of inertia and an angular acceleration. Normally, the apparatus has a sensor for measuring the rotational speed for this purpose. The inertia of the load determined by the module is usually transmitted to the control unit, which takes it into account when controlling the gyroscopes.

According to a second aspect, the present invention provides a crane having an apparatus according to the present invention, wherein the apparatus may be configured as described above. According to this second aspect, the load is attached to the cord and the cord is attached to the crane. The crane is here configured such that it is able to move the cord in space. Normally, the cord runs across a sheave on the crane so that the length of the cord can be adjusted by means of a suitable drive to move the load in a vertical direction. In a tangential direction, the load can usually be moved by rotating a jib of the crane, which normally extends from a base of the crane, about an axis of rotation of the crane. In a radial direction, the load can regularly be moved by means of a trolley that is movable in a horizontal direction or by means of a luffable jib. In particular, the terms radial and tangential are to be understood with respect to a center point along an axis of rotation of the crane. A crane according to the present invention may also be configured as a gantry crane or an overhead crane, in which case the movements of the cord suspension are Cartesian instead of cylindrical. For this purpose, the gantry crane or the overhead crane normally has a beam movable in a straight direction and carrying a trolley that is usually movable transversely to the direction of movement of the beam and along the beam. In most cases, the cord has a hook at its free end, the load being usually releasably attached to this hook.

A load-sway damping module of the crane according to the present invention is configured for controlling a movement of the cord by means of positioning commands in such a way that a pendulum movement of the load is compensated for and/or prevented. The load-sway damping of the load-sway damping module may fundamentally be configured in the way known from the prior art. The load-sway damping module of the crane is here communicatively coupled to the control unit of the apparatus and the positioning commands of the load-sway damping module for the movement of the rope are coordinated with the control of at least one of the gyroscopes through the control unit.

Preferably, the jib or the beam of the crane has provided thereon a second trolley. The second trolley normally has at least one guide rope attached thereto, one end of which is attachable to the apparatus. The guide rope usually improves the stable position of the apparatus. In the case of a gantry crane or an indoor crane, the second trolley may be provided on a second beam. Additionally or alternatively, one or more guide ropes may be tensioned between a guide frame and the apparatus, the guide frame being usually movable in a vertical direction along the crane tower by means of a wire rope hoist. The guide ropes are typically attached to the platform of the apparatus. The length of the guide ropes may be variable by means of a sheave on the trolley and/or the guide frame. A control unit for the second trolley and/or the guide frame is usually integrated in the crane control system.

Further details and advantages of the present invention can be seen from the description of embodiments following hereinafter in combination with the drawing, in which:

FIG. 1 *a*)-*d*) show side views of embodiments of a crane according to the present invention.

FIG. 1 *a*) shows an overhead crane with an elongate beam 2 that is movable along a rail 4 transversely to its longitudinal direction. The beam 2 carries on its underside a trolley 6 which is attached to the beam 2 such that it is movable along the longitudinal direction of the beam 2. The rail 4 is attached to a hall structure 8. A drive of the trolley and a drive of the beam are (not shown) connected in terms of control to a crane control system (not shown).

Figure 1A:
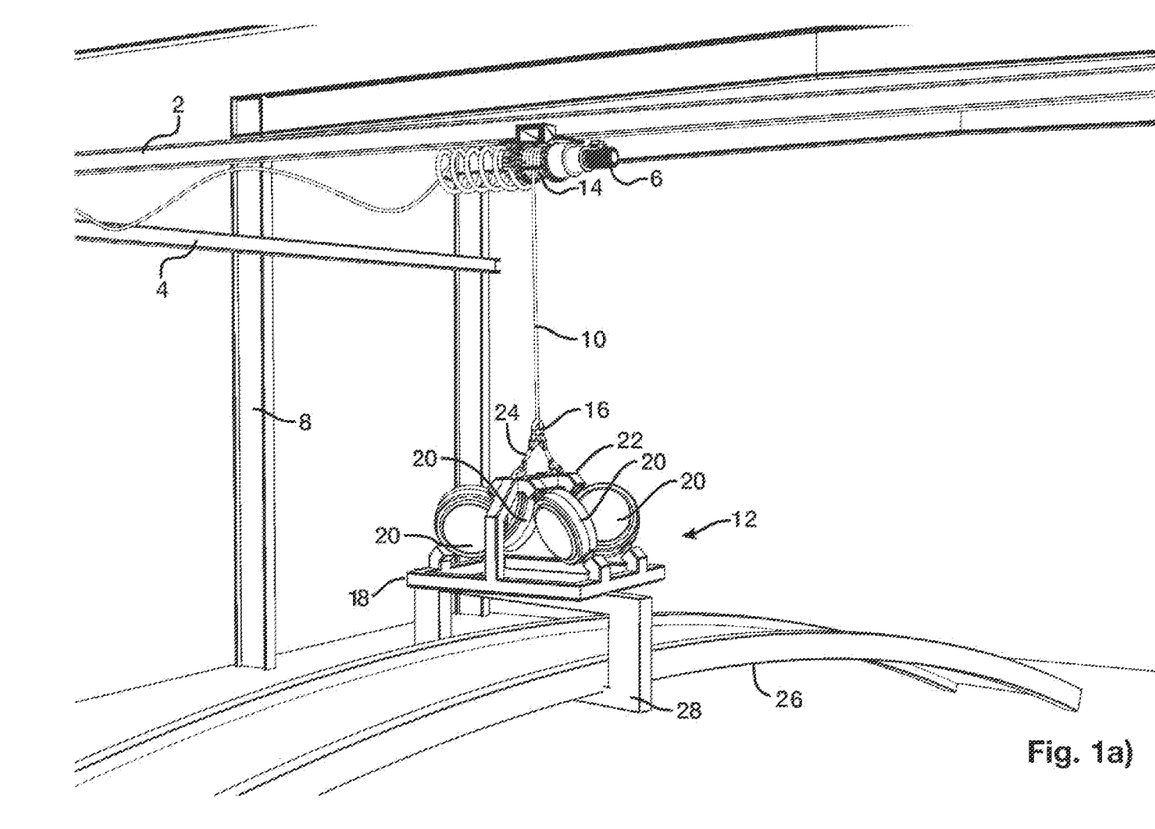

One end of a steel rope 10 is attached to the trolley 6 and an apparatus 12 is attached to the other end of the rope 10. The trolley 6 is here provided with a sheave 14 across which the rope 10 is guided and by means of which the length of the rope 10 below the trolley 6 can be varied. The other end of the rope 10 has an eye 16 that forms a suspension point of the apparatus 12 on the rope 10. The apparatus 12 includes a platform 18 having arranged thereon four gyroscopes as a "single gimbal control moment gyroscope roof array". The gyroscopes each include a drive for their rotor and a drive for their gimbal, which are arranged within a gimbal support 20. The apparatus 12 further comprises a control unit (not shown) that is connected to the drive of the gimbals of the gyroscopes in terms of control. When both the rotor and the gimbals of the gyroscopes are driven, the gyroscopes generate a resultant torque that is transmitted to the apparatus via the gimbal support 20, which is mounted to a frame 22 of the platform in a rotationally fixed manner. The frame 22 of the platform 18 is fastened to the eye 16 by means of two steel ropes 24, so that, by means of the resultant torque of the gyroscopes, the apparatus 12 is rotatable in the horizontal plane and pivotable relative to the horizontal plane.

A load in the form of a steel beam 26 is coupled to the apparatus 12 in a rotationally fixed manner. For this purpose, the apparatus 12 has a holding frame 28 which clamps the steel beam 26 therebetween, the clamping being releasable when the steel beam has been moved to the desired location in the desired orientation.

The apparatus 12, together with the steel beam 26, is suspended freely from the trolley 6 by means of the steel rope 10. A movement of the beam 2 and the trolley 6 in order to take the steel beam 26 to a specific location in the hall structure 8 will therefore normally lead to a pendulum movement of the apparatus 12 together with the steel beam 26. The crane control system includes a load-sway damping module which intelligently controls the displacement movements of the beam 2 and the trolley 6, so as to damp pendulum movements as far as possible. The load-sway damping module of the crane control system communicates with the control unit of the apparatus 12 so as to coordinate displacement movements of the beam and the trolley with the control of the gyroscopes by the control unit, so that the resultant torques of the gyroscopes support the load-sway damping and/or, in interaction with the crane control system, prevent a pendulum movement. The communication between the crane control system and the control unit of the gyroscopes may be wired or wireless (e.g. by means of radio communication).

FIG. 1 b) shows a gantry crane which is basically configured as described in connection with FIG. 1 a). Like components are provided with like reference numerals. The difference to the gantry crane according to FIG. 1 a) is that the platform 18 has on its underside a movable robot arm 30, instead of the holding frame 28 and the steel beam 26, as a load. The robot arm 30 is releasably attached to the platform 18 by means of a robot base provided with a flange 32. The robot arm 30 has a plurality of joints and its free end is provided with a tool 34 for processing a steel beam 26. A control module is connected to a drive of the robot arm 30 and a drive of the tool 34 in terms of control.

Figure 1B:
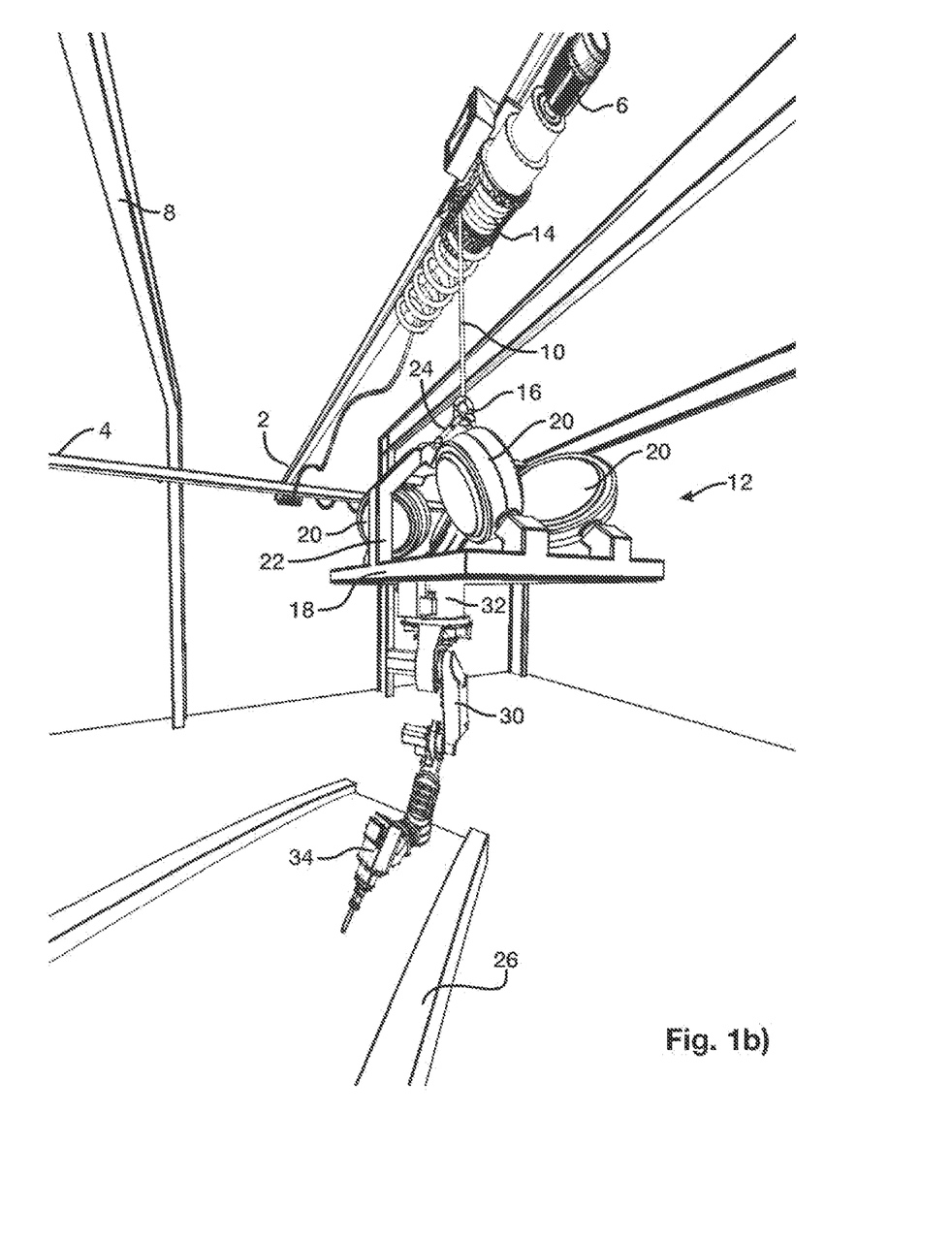

Both the movements of the robot arm 30 and the actions carried out with the tool 34 usually cause the apparatus 12 to be moved away from a position of equilibrium. This leads to pendulum oscillations of the apparatus 12 and of the robot arm 30 fastened to the apparatus 12. The load-sway damping module of the crane control system communicates with the control unit of the apparatus 12, which in turn communicates with the control module of the robot arm, so that the displacement movements of the beam and of the trolley, the control of the gyroscopes by the control unit and the movements of the robot arm 30 will be coordinated with one another, so that the resultant torques of the gyroscopes and the movements of the robot arm will support the load-sway damping and/or, in interaction with the crane control system, prevent a pendulum movement while the tool is carrying out an action. The communication between the control unit of the gyroscopes and the crane control system and the control module of the robot arm 30 may be wired or wireless (e.g. by means of radio communication). Typically, the control unit of the apparatus has a logic unit that is configured to predict and/or estimate, from the control commands of the control module and a response plan stored in the logic unit, the motor torques of the drive of the robot arm 30 and of the drive of the tool 34 and an associated expected deviation of the apparatus from the equilibrium position. The robot arm 30 is thus able to carry out manufacturing processes with the tool 34 over a large working space.

FIG. 1 c) shows a top-slewing tower crane with a crane tower 38 and a jib 40 projecting in a horizontal direction from the crane tower 38, the supporting structure of the crane tower 38 and that of the jib 40 each being a truss structure. A slewing gear 42 is positioned at the upper end of the crane tower 38, so that only the jib 40 and a counter jib 44 located opposite thereto will be moved during slewing movements through the slewing gear 42. The crane is controlled by a remote control unit (not shown) or from a crane cab 46 located close to the slewing gear 42.

Figure 1C:
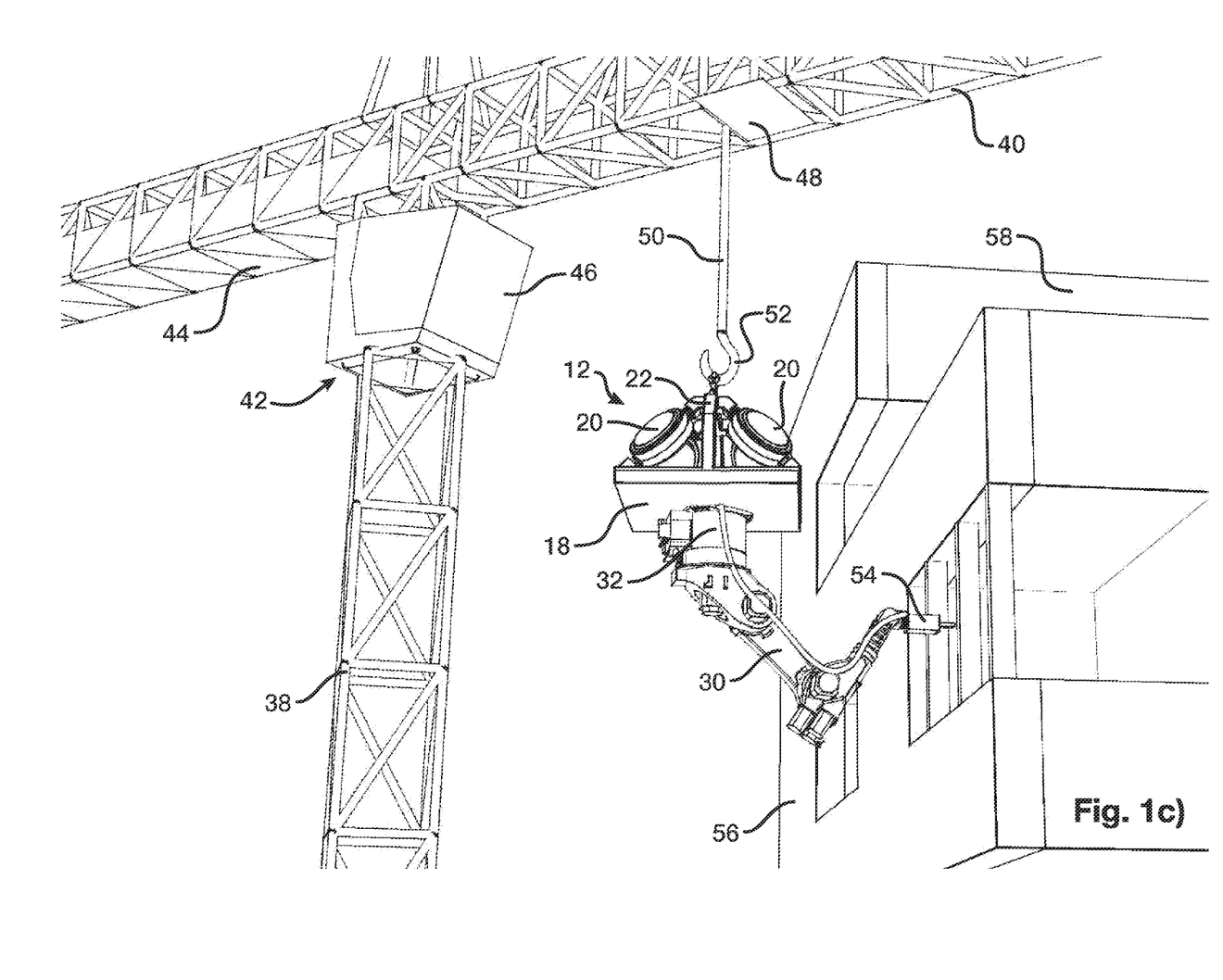
Figure 1D:
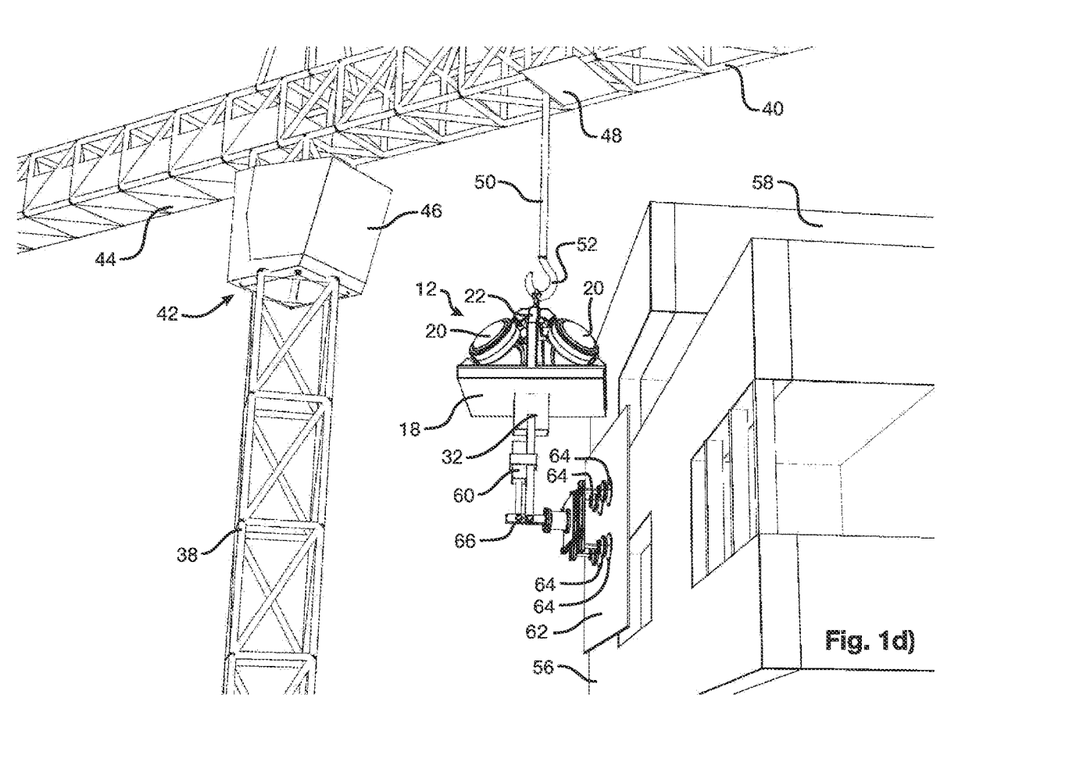

A trolley 48 is movable along the jib 40. A steel rope 50 is fastened to the trolley 48 and runs around a sheave of the trolley 48, so that the length of the steel rope below the trolley 48 can be varied. The lower end of the steel rope 50 has a hook 52 having attached thereto an apparatus 12, which is configured as described in connection with FIG. 1 b). Like components are provided with like reference numerals. Also the apparatus 12 according to FIG. 1 c) has a robot arm 30 attached thereto, which is adapted to be moved under the control of a control module. The free end of the robot arm 30 has a tool 54 provided thereon, which, in the present case, is configured for carrying out working steps on an outer wall 56 of a building 58.

Pendulum movements can be damped and/or compensated for or prevented as described above. The advantages of a top-slewing tower crane (large accomplishable jib lengths and load capacities, low space requirements in the area of the site as well as large tower heights) can thus be combined with the advantages of industrial robots.

FIG. 1 d) shows a top-slewing tower crane, which is configured as described in connection with FIG. 1 c) and to which an apparatus 12 is attached that is configured as described above. Like components are provided with like reference numerals. A kinematic unit 60 controlled by a control module is attached to the underside of the platform 18, the kinematic unit holding a glass plate 62 by means of a vacuum applied to the glass plate 62 through suction cups 64. The robot 60 has a joint 66 by means of which the glass plate 62 can be pivoted. It follows that, with the robot 60 attached to the apparatus 12, the glass plate 62 can be picked up from a storage location and inserted into a window of a building 58, as indicated in FIG. 1 d). Pendulum movements during transport or insertion of the glass plate can be damped and/or compensated for or prevented as described above.

The control unit of the apparatus 12 according to FIG. 1 a) to d) is usually configured so as to be suitable for communication with sensors that detect deviations of the apparatus from the equilibrium position or external disturbance variables, such as wind or collisions.

Figure 2:
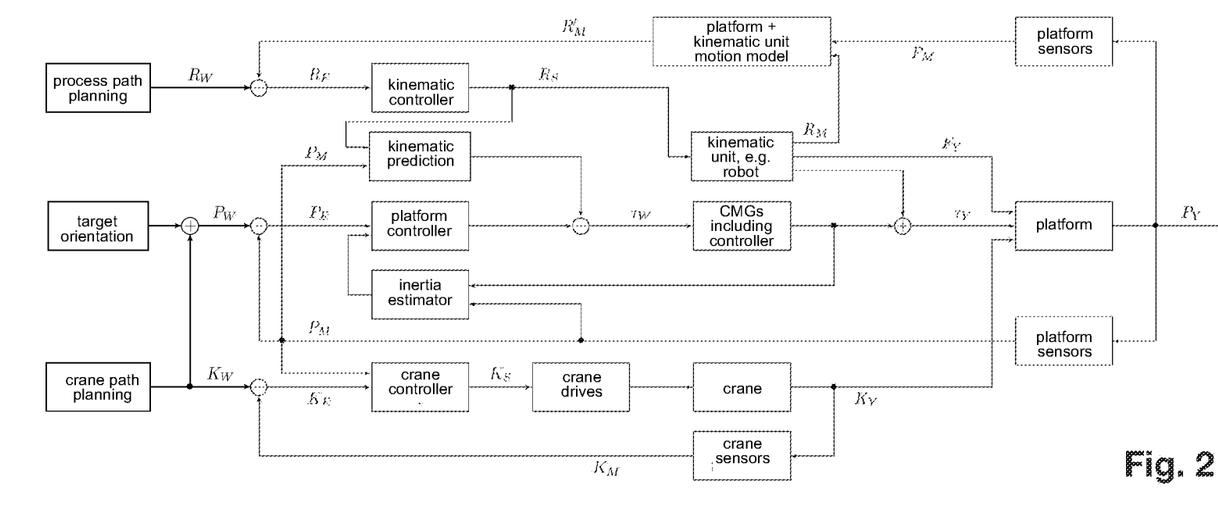
FIG. 2 shows a control flow diagram of the embodiment according to FIG. 1 *b*), *c*) or *d*)

The input variable, referred to as crane path planning in FIG. 2, corresponds to a planned movement of the cord in space by means of the crane. This input variable is used by the loadsway damping module, referred to as crane controller, to intelligently control the crane drives. The movement of the cord by means of the crane is detected by crane sensors, whose signals, in turn, are taken into account in the load-sway damping module.

The input variable, referred to as target orientation in FIG. 2, corresponds to a desired position of the load at a specific location. This input variable is used by the control unit, referred to as platform controller, for controlling the gyroscopes, referred to as CMGs, such that the load will assume the desired position at the specific location. In so doing, the control unit takes into account the crane path planning. The gyroscopes are here coupled to a platform to which a robot is attached. The platform with the robot forms here the load.

The input variable, referred to as process path planning in FIG. 2, corresponds to a desired movement and/or a desired action of the robot, which the robot executes under the control of a control module referred to as a kinematic controller. The control commands originating from the control module are taken into account as kinematic prediction by the control unit for controlling the gyroscopes. The platform has associated therewith platform sensors, whose signals are input in an inertia estimator and a motion model. The inertia estimator determines the inertia of the load based on the torque transmitted to the load by the gyroscopes and a measured rotational speed of the load. The inertia of the load is, in turn, taken into account by the control unit for controlling the gyroscopes. The motion model, in turn, is taken into consideration in the control module.

The control flow of the embodiment according to FIG. 2 illustrates the comprehensive solution for controlled movement and stabilization of a load. Since the dynamics of the crane, the dynamics of the rigid platform and the dynamics of the movable robot influence one another, they are taken into account in the control of the gyroscopes through the control unit. According to this embodiment, the crane thus compensates for and/or prevents a pendulum movement during transport of the load to a destination, during alignment of the load at the destination, and during a controlled movement or action of the movable element of the load.

Figure 3:
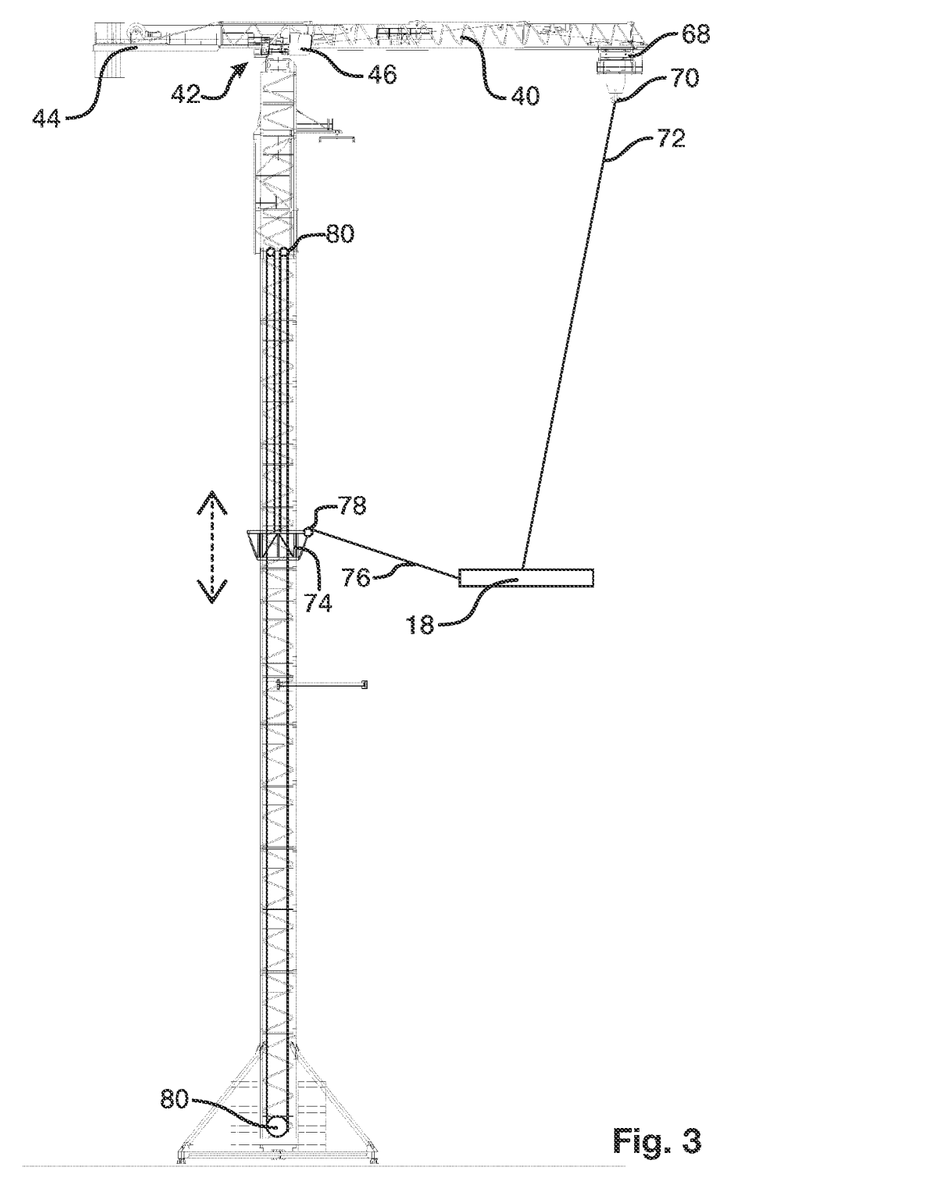
FIG. 3 shows a side view of a crane with a guide rope for stabilizing a freely suspended platform.

FIG. 3 shows a top-slewing crane comprising a crane tower 38, a slewing gear 42 and a jib 40, a counter jib 44 provided with weights and a crane cab 46. A trolley 68 is supported such that it is movable along the jib 40. The trolley 68 has a hook 70 having attached thereto one end of a steel rope 72. The other end of the steel rope 72 is attached to a platform 18, which may be configured as shown in FIG. 1 a) to d). In particular, the platform 18 may be part of an apparatus 12 according to the present invention, which is not fully shown in FIG. 3. Accordingly, the crane control system is usually in communicative connection with the control unit of the apparatus 12. The control unit of the apparatus 12 may, in turn, be in communicative connection with a control module of an actuator that may preferably be attached to the underside of the platform 18. The crane tower 38 of the crane has a guide frame 74, which is movable along the crane tower 38 (cf. vertical double arrow) and which has attached thereto a guide rope 76 that is guided across a sheave 78 so that its length can be changed. The sheaves of a wire rope hoist, which changes the vertical position of the guide frame 74, are here identified by reference numeral 80. A control unit for changing the length of the guide rope 76 and for changing the vertical position of the guide frame 74 is usually integrated in the crane control system. The guide rope 76 improves the attitude stabilization of the platform 18.

LIST OF REFERENCE NUMERALS 2 beam
4 rail
6 trolley
8 hall structure
10 steel rope
12 apparatus
14 sheave
16 eye
18 platform
20 gyroscope gimbal
24 steel rope
26 steel beam
28 holding frame
30 robot arm
32 robot base with flange
34 tool
38 crane tower
40 jib
42 slewing gear
44 counter jib
46 crane cab
48 trolley
50 steel rope
52 hook
54 tool
56 outer wall
58 building
60 kinematic unit
62 glass plaste
64 suction cup
66 joint
68 trolley
70 hook
72 steel rope
74 guide frame
76 guide rope
78 sheave
80 wire rope hoist

The invention claimed is:

1. An apparatus for controlling a movable load suspended on a cord and having a controllable actuator, which is an assembly robot, the apparatus comprising a control unit and at least one compensating device, wherein the control unit is configured to use control commands for controlling the controllable actuator in order to predict an expected load countermovement, so as to compensate for and/or prevent the load countermovement by controlling the at least one compensating device controlled by the control unit.

2. The apparatus according to claim 1, characterized in that the apparatus is configured such that the load is maintained in an equilibrium of forces at a position that does not correspond to the equilibrium position.

3. The apparatus according to claim 1, characterized in that the movements of the controllable actuator are controllable such that they supportively compensate for and/or prevent the pendulum movement of the load.

4. The apparatus according to claim 1, characterized by a sensor for detecting a position of the load relative to its suspension and transmit signals to the control unit, wherein the control unit is configured to evaluate the signals.

5. The apparatus according to claim 1, characterized in that the compensating device comprises a plurality of gyroscopes, which are adapted to transmit a moment of force to the load, the moment of force being generable by a rotation of an axis of rotation of at least one of the gyroscopes, and the control unit is connected in terms of control to the gyroscopes, so as to control the rotation of the axis of rotation such that a pendulum movement of the load can be compensated for and/or prevented and the load is tilted and/or rotated about its suspension.

6. The apparatus according to claim 5, characterized in that, the controllable actuator is configured to execute a working step, and is configured to compensate for a moment of interaction on the load by controlling at least one of the gyroscopes.

7. The apparatus according to claim 5, characterized by a sensor which is used for detecting an external disturbance variable and transmitting signals to the control unit, and control unit, wherein the control unit is configured to evaluate the signals and compensate for and/or preventing the pendulum movement of the load by controlling at least one of the gyroscopes.

8. The apparatus according to claim 5, characterized by a sensor for detecting a pendulum movement of the load, the signals are transmitted to the control unit and evaluated by the control unit for compensating for and/or preventing the pendulum movement of the load by controlling at least one of the gyroscopes.

9. A crane comprising:
an apparatus for controlling a movable load suspended on a cord and having a controllable actuator, which is an assembly robot, the apparatus comprising a control unit and at least one compensating device, wherein the control unit is configured to use control commands for controlling the controllable actuator in order to predict an expected load countermovement, so as to compensate for and/or prevent the load countermovement by controlling the at least one compensating device controlled by the control unit, wherein the load is attached to the cord and the cord is attached to the crane and is movable in space by the crane.

10. The crane according to claim 9, characterized by a load-sway damping module configured for controlling a movement of the cord by means of positioning commands in such that a pendulum movement of the load is compensated for and/or prevented, and wherein the load-sway damping module of the crane is communicatively coupled to the control unit of the apparatus and the positioning commands of the load-sway damping module for the movement of the rope are coordinated with the controlling of the axis of rotation through the control unit.

* * * * *